(12) United States Patent
Umemoto et al.

(10) Patent No.: US 9,397,546 B2
(45) Date of Patent: Jul. 19, 2016

(54) FIELD ROTOR WITH COOLING PASSAGES FOR SUPERCONDUCTING ELECTRIC MACHINE

(71) Applicant: KAWASAKI JUKOGYO KABUSHIKI KAISHA, Kobe-shi, Hyogo (JP)

(72) Inventors: Katsuya Umemoto, Akashi (JP); Yoshichika Sato, Kakogawa (JP); Satoru Takao, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/382,095

(22) PCT Filed: Feb. 12, 2013

(86) PCT No.: PCT/JP2013/000741
§ 371 (c)(1),
(2) Date: Aug. 29, 2014

(87) PCT Pub. No.: WO2013/128813
PCT Pub. Date: Sep. 6, 2013

(65) Prior Publication Data
US 2015/0018219 A1 Jan. 15, 2015

(30) Foreign Application Priority Data

Feb. 29, 2012 (JP) ................. 2012-043510

(51) Int. Cl.
*H02K 9/00* (2006.01)
*H02K 55/04* (2006.01)
(Continued)

(52) U.S. Cl.
CPC .................. *H02K 55/04* (2013.01); *H02K 1/32*
(2013.01); *H02K 9/005* (2013.01); *H02K 3/46*
(2013.01); *H02K 2203/12* (2013.01); *Y02E 40/625* (2013.01)

(58) Field of Classification Search
CPC .......... H02K 55/04; H02K 1/32; H02K 9/005
USPC ......................................................... 310/54
See application file for complete search history.

(56) References Cited

U.S. PATENT DOCUMENTS 3,737,693 A 6/1973 Mishima
5,627,709 A * 5/1997 Salasoo ........................... 361/19
(Continued)

FOREIGN PATENT DOCUMENTS

FR 1127779 A 12/1956
JP U-63-105441 7/1988
(Continued)

OTHER PUBLICATIONS

International Search Report issued in International Application No. PCT/JP2013/000741 dated May 21, 2013.
(Continued)

*Primary Examiner* — Naishadh Desai
(74) *Attorney, Agent, or Firm* — Oliff PLC

(57) ABSTRACT

A field rotor of a superconducting rotary machine, includes a rotary shaft, a plurality of coil boxes, and a plurality of superconducting coils. The coil boxes extend in a center axis direction of the rotary shaft, have walls defining spaces within the coil boxes, respectively, and are removably fastened to a peripheral surface of the rotary shaft. The superconducting coils are disposed in the spaces of the coil boxes, respectively, and constitute field windings of the superconducting rotary machine.

9 Claims, 10 Drawing Sheets

(51) Int. Cl.
*H02K 1/32* (2006.01)
*H02K 3/46* (2006.01)

(56) References Cited

U.S. PATENT DOCUMENTS 5,672,921 A * 9/1997 Herd et al. ................ 310/52
2012/0053060 A1 3/2012 Shinzato et al.

FOREIGN PATENT DOCUMENTS

| JP | A-03-128662 | 5/1991 |
| JP | A-04-244749 | 9/1992 |
| JP | U-06-066261 | 9/1994 |
| JP | 2555132 B2 | 11/1996 |
| JP | A-2011-041403 | 2/2011 |
| JP | A-2011-142773 | 7/2011 |

OTHER PUBLICATIONS

Jan. 26, 2016 Extended Search Report issued in European Patent Application No. 13754553.9.

Feb. 3, 2016 Office Action issued in Chinese Patent Application No. 201380007151.3.

* cited by examiner

FIELD ROTOR WITH COOLING PASSAGES FOR SUPERCONDUCTING ELECTRIC MACHINE

TECHNICAL FIELD

The present invention relates to a field rotor of a superconducting rotary machine.

BACKGROUND ART

Patent Literature 1 discloses a rotor core of a superconducting rotary machine. The rotor core of the superconducting rotary machine is constituted by a substantially hollow cylindrical body which is made of a non-magnetic material and has therein a ring-shaped space axially extending therethrough. The rotor core is cooled by a helium gas flowing from a base end side of the rotor core to a terminal end side of the rotor core and the helium gas flowing from the terminal end side of the rotor core to the base end side of the rotor core.

CITATION LIST

Patent Literature

Patent Literature 1: Japanese Laid-Open Patent Application Publication No. 2011-041403

SUMMARY OF INVENTION

Technical Problem

An object of the present invention is to provide a structure of a field rotor of a superconducting rotary machine which allows the field rotor to be manufactured more easily and more accurately than a conventional example and allows a great electromagnetic force generated in a superconducting coil to be sustained.

Solution to Problem

According to a first aspect of the present invention, there is provided a field rotor of a superconducting rotary machine, comprising: a rotary shaft; a plurality of coil boxes; and a plurality of superconducting coils; wherein the coil boxes extend in a center axis direction of the rotary shaft, have walls defining spaces within the coil boxes, respectively, and are removably fastened to a peripheral surface of the rotary shaft; and wherein the superconducting coils are disposed in the spaces of the coil boxes, respectively, and constitute field windings of the superconducting rotary machine.

According to a second aspect of the present invention, there is provided a field rotor of a superconducting rotary machine comprising a rotary shaft, a plurality of superconducting coils, low-heat contraction members, and coil retaining members, wherein each of the coil retaining members is configured to retain the corresponding superconducting coil on a peripheral surface of the rotary shaft in a state in which the superconducting coil is disposed between the coil retaining member and the peripheral surface of the rotary shaft and the coil retaining member is fastened to the peripheral surface of the rotary shaft, each of the low-heat contraction members is provided in a location which is at least one of between the superconducting coil and the coil retaining member, and between the superconducting coil and the peripheral surface of the rotary shaft, the low-heat contraction members have a lower mean coefficient of linear thermal expansion than the coil retaining members, and the superconducting coils constitute field windings of the superconducting rotary machine.

Advantageous Effects of Invention

A field rotor of a superconducting rotary machine of the present invention has an advantage that it becomes possible to provide a structure which allows the field rotor to be manufactured more easily and more accurately than a conventional example.

DESCRIPTION OF EMBODIMENTS

Figure 1:
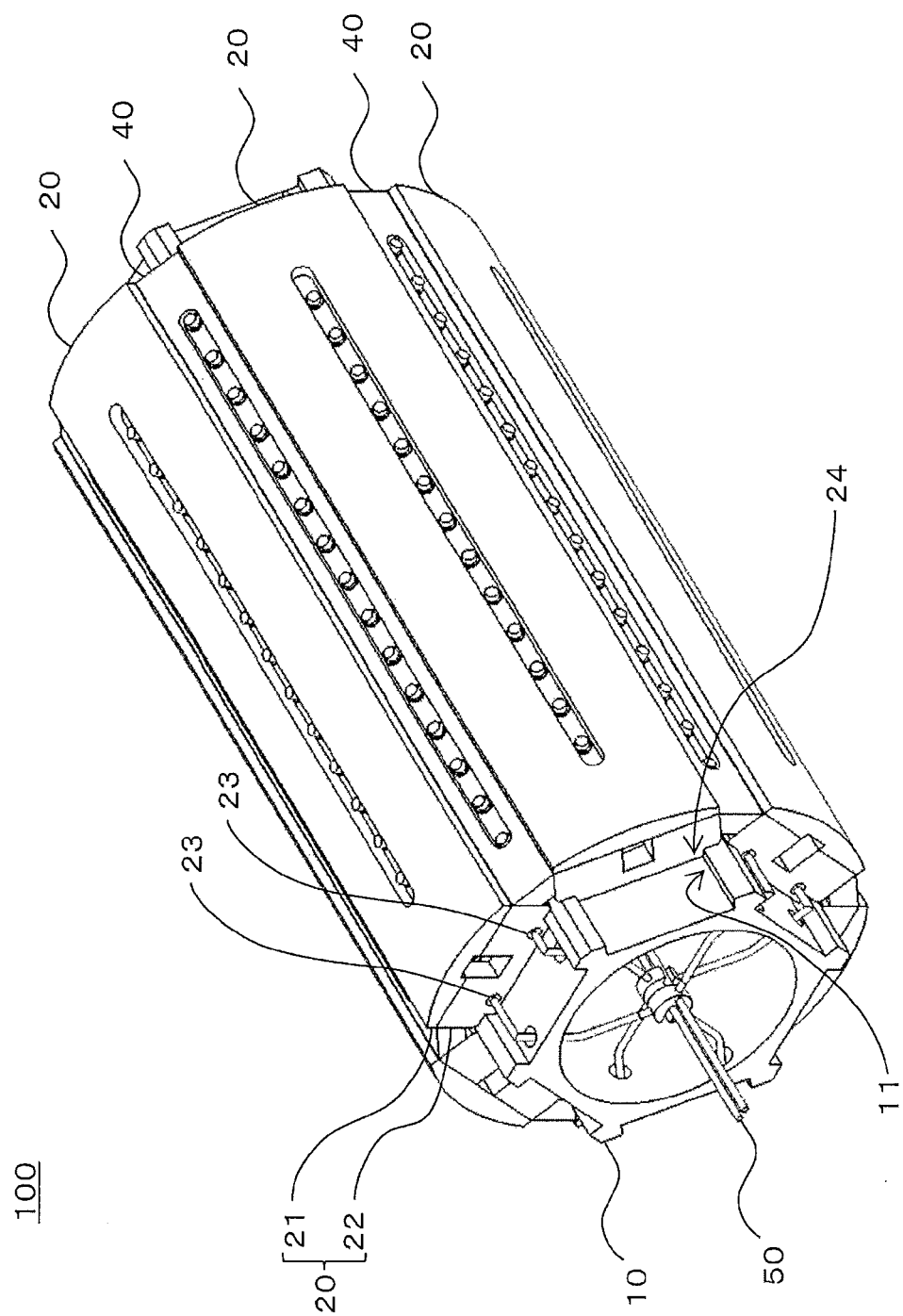
FIG. 1 is a perspective view showing the exemplary schematic configuration of a field rotor of a superconducting rotary machine according to Example 1 of Embodiment 1.

Hereinafter, embodiments of the present invention will be described with reference to the accompanying drawings. Hereinafter, "center axis", "peripheral surface", "circumferential direction", and "radial direction" refer to the center axis, peripheral surface, circumferential direction and radial direction of a rotary shaft, respectively, unless otherwise noted. Also, for easier description, a center axis direction will be referred to as a forward and rearward direction, a side at which driving power is input and output will be referred to as "front side" and a side at which electric power and a cooling medium (refrigerant) are input and output will be referred to as "rear side".

Embodiment 1

A field rotor of a superconducting rotary machine according a first aspect of Embodiment 1 comprises a rotary shaft, a plurality of coil boxes, and a plurality of superconducting coils, and the coil boxes extend in a center axis direction of the rotary shaft, have walls defining spaces within the coil boxes, respectively, and are removably fastened to a peripheral surface of the rotary shaft, and the superconducting coils are placed in the spaces of the coil boxes, respectively, and constitute field windings of the superconducting rotary machine.

In this configuration, the coil boxes storing the superconducting coils, respectively, can be assembled, and then the coil boxes can be mounted to the rotary shaft. This makes it possible to manufacture the field rotor more easily and more accurately than a configuration in which the superconducting coils are directly mounted to the rotary shaft. In addition, the coil boxes are capable of sustaining a great electromagnetic force ([hoop stress]: force for causing the coils to expand in a direction perpendicular to an axial direction [winding axis direction]) generated in the superconducting coils.

The rotary shaft is an output shaft when the superconducting rotary machine is an electric motor, and is an input shaft when the superconducting rotary machine is an electric generator.

Each of the coil boxes may be composed of one member or a plurality of members. A method of fastening the coil boxes to the peripheral surface of the rotary shaft is not particularly limited. The coil boxes may be fastened to the peripheral surface of the rotary shaft, for example, by bolting, screwing, welding, etc.

The coil boxes are preferably configured to be openable and closable. In this configuration, the superconducting coils can be put into and out of the coil boxes, respectively. As a result, maintenance work can be easily carried out.

The number of coil boxes is not particularly limited, and the number of superconducting coils is not particularly limited.

The "peripheral surface" may be, for example, a curved surface or a flat surface.

According to a second aspect of Embodiment 1, in the field rotor of the superconducting rotary machine according to the first aspect, each of the coil boxes includes therein a cooling medium passage through which a cooling medium used for cooling the superconducting coil flows.

In accordance with this configuration, since the coil box includes the cooling medium passage, the superconducting coil can be cooled more effectively than, for example, a configuration in which the cooling medium passage is provided in the rotary shaft.

The kind of the cooling medium is not particularly limited. For example, as the cooling medium, liquid nitrogen, liquid helium, or a low-temperature helium gas may be used. For example, the cooling medium passage may be provided separately in the inner space of the coil box or in the wall of the coil box. Or, the cooling medium passage may be formed by a hole provided in the wall of the coil box and the inner space of the coil box.

According to a third aspect of Embodiment 1, the field rotor of the superconducting rotary machine according to the second aspect comprises gaps formed between the respective coil boxes and the peripheral surface such that each of the gaps extends in the center axis direction and a circumferential direction of the rotary shaft.

In this configuration, since each of the coil boxes and the rotary shaft are thermally insulated from each other via the gap, the superconducting coil can be cooled more effectively.

The "circumferential direction" is a direction perpendicular to the axial direction and the radial direction. The peripheral surface may be, for example, a curved surface or a flat surface.

According to a fourth aspect of Embodiment 1, the field rotor of the superconducting rotary machine according to the third aspect, further comprises protective resistors which are fastened to the coil boxes, respectively such that the protective resistors are disposed within the gaps, respectively, and are connected in parallel with the superconducting coils corresponding to the gaps, respectively.

In this configuration, if breakdown of a superconductivity occurs, the superconducting coils can be protected by the protective resistors. In addition, since the protective resistors can be efficiently disposed within the gaps, respectively, the field rotor can be reduced in size.

The protective resistor refers to a resistor connected to a power supply circuit in parallel with the superconducting coil to protect the superconducting coil when breakdown of a superconductivity occurs. For example, if a problem arises in some of the superconducting coils, its superconductive state is lost and its temperature rises (normal conduction transition: quench), a circuit including the superconducting coils and the protective resistors is disconnected from the electric power supply, so that the protective resistors quickly convert energy of a current flowing through the superconducting coils into heat energy, or the like. This can reduce a possibility of a combustion damage to the superconducting coils.

The phrase "the superconducting coils corresponding to the gaps, respectively" means that the superconducting coil is stored in a particular coil box when a gap is formed between the particular coil box and the rotary shaft.

According to a fifth aspect of Embodiment 1, the field rotor of the superconducting rotary machine according to one of the first to fourth aspects, further comprises low-heat contraction members, each of which is disposed between an inner surface of corresponding one of the coil boxes and corresponding one of the superconducting coils stored in the coil boxes, respectively, and the low-heat contraction members have a lower mean coefficient of linear thermal expansion than the coil boxes.

If a thermal contraction (shrinkage) amount of the superconducting coil due to cooling is larger than that of the coil box, the contact interface pressure of the heat transfer surfaces of the superconducting coil and of the coil box via which heat is transferred to cool the superconducting coil by the coil box, is reduced, due to a difference in the thermal contraction amount between them. In such a case, in accordance with the above configuration, since the thermal contraction amount of the low-heat contraction member is reduced, the contact interface pressure of the heat transfer surface can be made higher than a case where the low-heat contraction member is not provided. If the contact interface pressure of the cooling surface required to cool the superconducting coil is kept properly, the heat conduction can be performed smoothly. This makes it possible to cool the superconducting coil more efficiently and uniformly.

According to a sixth aspect of Embodiment 1, in the field rotor of the superconducting rotary machine according to the fifth aspect, the low-heat contraction members have a lower mean coefficient of linear thermal expansion than the superconducting coils.

In this configuration, increasing of the contact interface pressure of the heat transfer surface can be further facilitated.

It is desired that the configuration (material, shape, size, etc.) of the low-heat contraction members be set to increase the contact interface pressure of the heat transfer surface as much as possible provided that the superconducting coil is not damaged.

The mean coefficient of linear thermal expansion may be defined as a mean coefficient of linear thermal expansion in a temperature range from a room temperature. The room temperature may be a temperature before the coil is cooled. Specifically, the mean coefficient of linear thermal expansion in a temperature range from the room temperature may be a mean coefficient of linear thermal expansion in a temperature range from the temperature at a time point before the coil is cooled to a temperature at a time point when the coil has been cooled. More specifically, for example, the value of the mean coefficient of linear thermal expansion is a rate of expansion of the length of an object due to a temperature increase, which is expressed per 1 degrees C. (=1K) with the room temperature being a reference temperature, and its unit may be 1/K. The mean coefficient of linear thermal expansion of the low-heat contraction member and the mean coefficient of linear thermal expansion of the superconducting coil are preferably set so that the linear thermal expansion amount of the whole member including the low-heat contraction member and the superconducting coil is preferably substantially equal to or less than that of the coil box.

The location at which the low-heat contraction member is placed is not particularly limited. For example, the low-heat contraction member may be disposed between the superconducting coil and the wall which faces the superconducting coil in the radial direction of the rotary shaft, between the superconducting coil and the wall which faces the superconducting coil in the circumferential direction of the rotary shaft, or between the superconducting coil and the wall which faces the superconducting coil in the center axis direction of the rotary shaft.

During supply of a current, due to a hoop stress, the superconducting coil tends to expand in a direction (center axis direction of the rotary shaft, circumferential direction of the rotary shaft) which is perpendicular to the axial direction (winding axis direction) of the coil. For this reason, it is less likely that a gap is formed between the coil and the wall in the direction perpendicular to the axial direction of the coil. In contrast, no hoop stress acts in the axial direction of the coil (radial direction of the rotary shaft), and hence it is more likely that a gap is formed between the coil and the wall in the axial direction of the coil. If the gap is generated, a heat conductivity degrades, and the temperature distribution of the superconducting coil is more likely to become non-uniform. In light of this, the low-heat contraction member may be disposed between the superconducting coil and the wall which faces the superconducting coil in the radial direction of the rotary shaft. This makes it possible to improve the uniformity of the temperature distribution of the superconducting coil. The low-heat contraction member may be disposed only between the superconducting coil and the wall which faces the superconducting coil in the radial direction of the rotary shaft. In this configuration, it becomes possible to attain both of the uniformity of the temperature distribution of the superconducting coil and reduction of a size of the device.

According to a seventh aspect of Embodiment 1, in the field rotor of the superconducting rotary machine according to any one of the first to sixth aspects, wherein the peripheral surface is provided with a plurality of recesses corresponding to the coil boxes, respectively; wherein the recesses are formed to face corresponding coil boxes, respectively; wherein each of the recesses has side surfaces extending in the center axis direction; wherein each of the coil boxes is provided with a convex portion extending in the center axis direction and protruding toward the rotary shaft, and the convex portion is fitted into a corresponding one of the recesses in a state in which the convex portion is in contact with the side surfaces of the recess extending in the center axis direction.

In this configuration, torque generated in the superconducting coil can be efficiently transmitted to the rotary shaft via the contact surfaces of the coil box and of the rotary shaft. In addition, the contact portions of the coil box and of the rotary shaft can be reduced to a smallest possible extent to reduce a heat conductivity between the coil box and the rotary shaft. This allows the superconducting coil and the coil box to be cooled more efficiently.

The convex portion and the recess are not necessarily in contact with each other in entire of the side surface. The convex portion and the recess may be in contact with each other in lines parallel to the center axis direction or at plural points.

According to an eighth aspect of Embodiment 1, the field rotor of the superconducting rotary machine according to any one of the first to seventh aspects, further comprises a plurality of wedge members; wherein each of the wedge members extends in the center axis direction and is disposed at a corresponding pair of two coil boxes which are adjacent in the circumferential direction of the rotary shaft such that the wedge member is sandwiched between the two coil boxes and is in contact with the two coil boxes.

In this configuration, a component of the hoop stress generated in the superconducting coils, which component does not contribute to the torque, can be cancelled via one wedge member corresponding to the two adjacent coil boxes.

According to a ninth aspect of Embodiment 1, in the field rotor of the superconducting rotary machine according to any one of the second to fourth aspects, the cooling medium passage is formed inside a portion of the wall which faces the rotary shaft.

In this configuration, the cooling medium passage can be integrated with the coil box, and the field rotor can be manufactured more easily and more accurately.

In Embodiment 1, the cooling medium passage, the gap, the protective resistor, the low-heat contraction member, the recess, the convex portion, and the wedge member are not essential constituents, and may be suitably omitted.

The superconducting rotary machine of the present embodiment may include, for example, a superconducting motor and a superconducting generator. Although the following examples are described assuming that a voltage and a current are supplied continuously from outside the rotary machine to the field windings of the field rotor, the field windings may be used in a permanent current mode in which a voltage and a current are not supplied continuously from outside the rotary machine to the field windings.

Example 1

Figure 2:
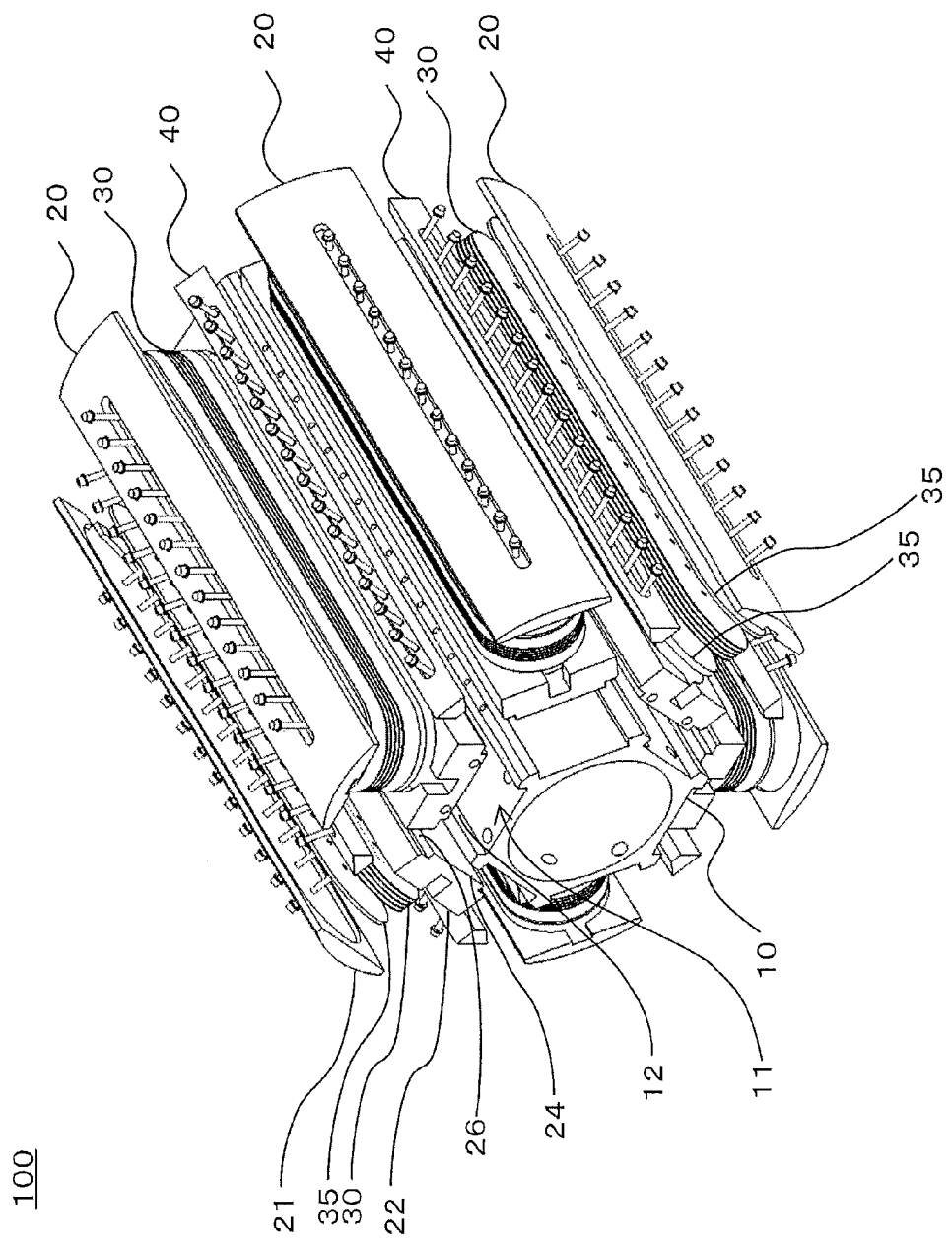
FIG. 2 is an exploded view showing the schematic configuration of the field rotor of the superconducting rotary machine according to Example 1 of Embodiment 1.
Figure 3:
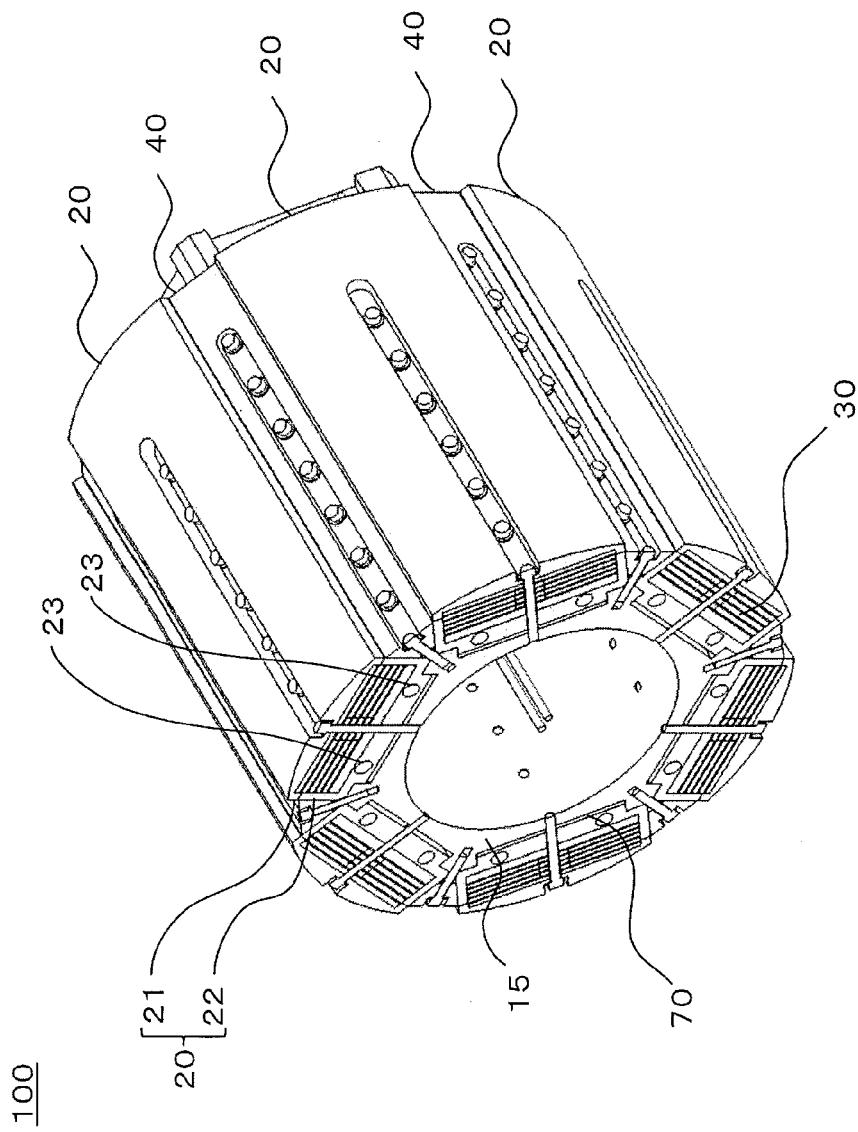
FIG. 3 is a perspective view showing the cross-section of the schematic configuration of the field rotor of the superconducting rotary machine according to Example 1 of Embodiment 1.
Figure 4:
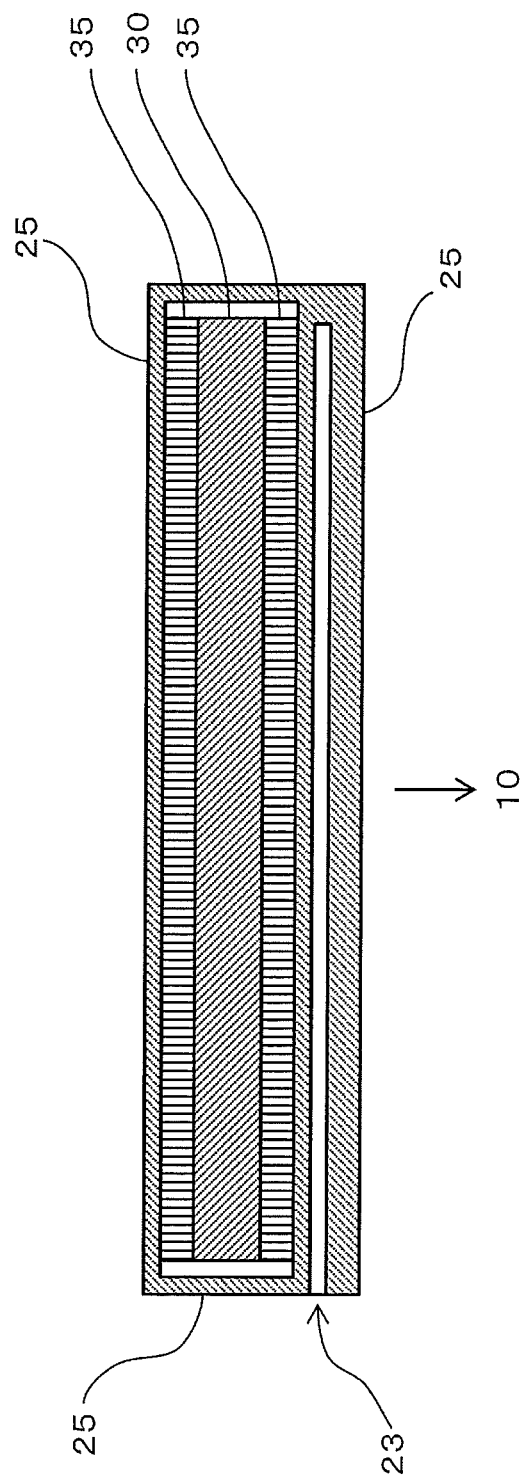
FIG. 4 is a schematic view showing the cross-section of the structure of a coil box 20 according to Example 1 of Embodiment 1, the cross-section being taken along a plane which is parallel to a center axis and perpendicular to a peripheral surface.
Figure 5:
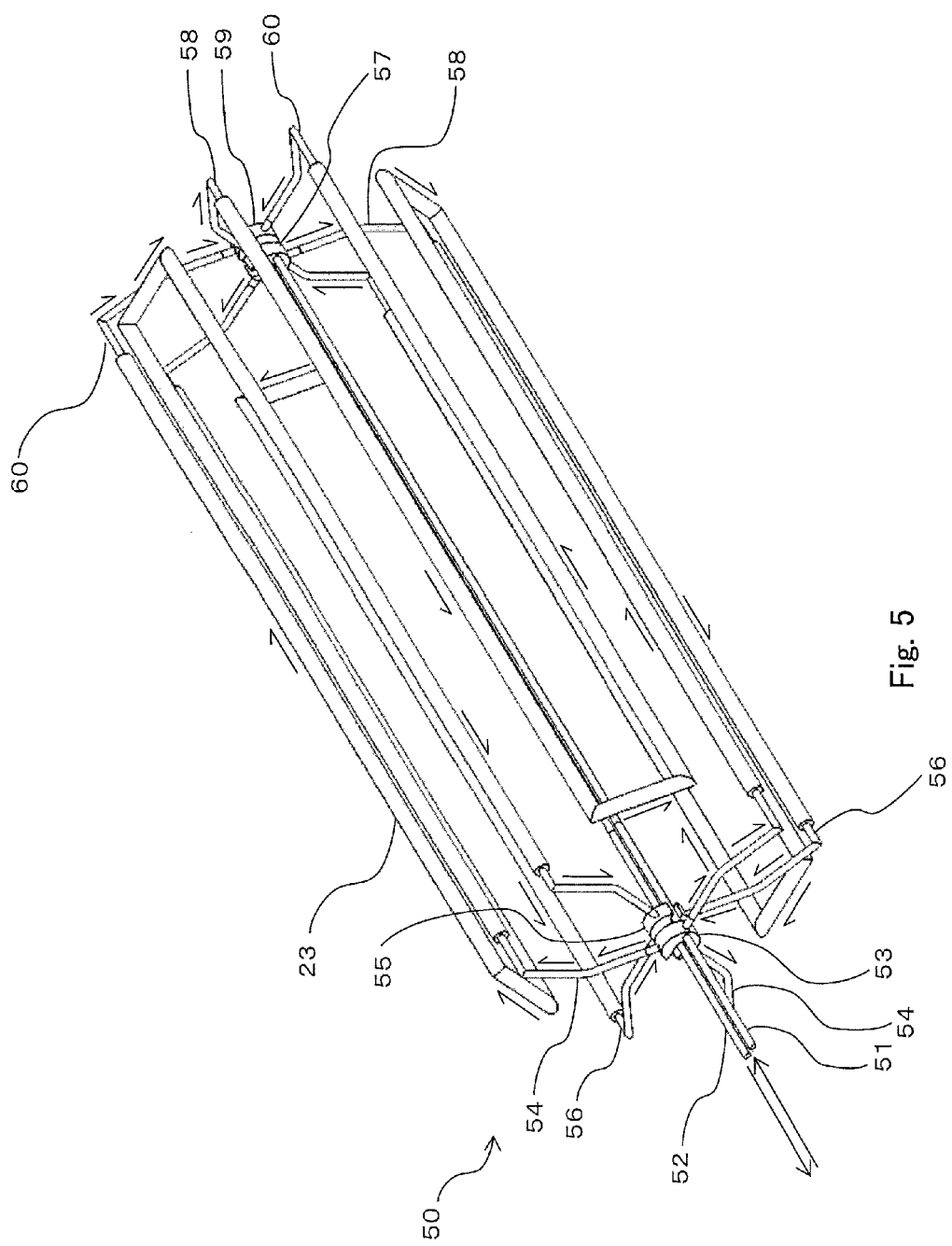
FIG. 5 is a perspective view showing the schematic configuration of a cooling medium passage of the field rotor of the superconducting rotary machine according to Example 1 of Embodiment 1.

FIG. 1 is a perspective view showing the schematic configuration of a field rotor of a superconducting rotary machine according to Example 1 of Embodiment 1. FIG. 2 is an exploded view showing the schematic configuration of the field rotor of the superconducting rotary machine according to Example 1 of Embodiment 1. FIG. 3 is a perspective view showing the cross-section of the schematic configuration of the field rotor of the superconducting rotary machine according to Example 1 of Embodiment 1. FIG. 4 is a schematic view showing the cross-section of the structure of a coil box 20 according to Example 1 of Embodiment 1, the cross-section being taken along a plane which is parallel to a center axis and perpendicular to a peripheral surface. FIG. 5 is a perspective view showing the schematic configuration of a cooling medium passage of the field rotor of the superconducting rotary machine according to Example 1 of Embodiment 1.

A field rotor 100 of the superconducting rotary machine of Example 1 comprises a rotary shaft 10, a plurality of coil boxes 20, and a plurality of superconducting coils 30, and the coil boxes 20 extend in a center axis direction of the rotary shaft 10, have walls 25 defining spaces within the coil boxes, respectively, and are removably fastened to a peripheral surface of the rotary shaft 10, and the superconducting coils 30 are placed in the spaces of the coil boxes 20, respectively, and constitute field windings of the superconducting rotary machine.

Each of the coil boxes 20 includes therein a cooling medium passage 23 through which a cooling medium used for cooling the corresponding superconducting coil 30 flows. The cooling medium passage 23 is formed inside a portion (wall extending in the center axis direction and the circumferential direction in a location closest to the rotary shaft 10) of the wall 25 which portion faces the rotary shaft 10.

The field rotor 100 includes low-heat contraction members 35, each of which is disposed between the inner surface of the coil box 20 and the superconducting coil 30 stored in the coil box 20, and has a lower mean coefficient of linear thermal expansion than the coil box. The mean coefficient of linear thermal expansion of the low-heat contraction member 35 may be lower than that of the coil box and that of the superconducting coil.

The peripheral surface of the rotary shaft 10 is provided with a plurality of recesses 11 corresponding to the coil boxes 20, respectively. The recesses 11 are formed to face the corresponding coil boxes 20, respectively. Each of the recesses 11 has side surfaces 12 extending in the center axis direction of the rotary shaft 10. Each of the coil boxes 20 has a convex portion 24 which extends in the center axis direction, protrudes toward the rotary shaft 10, and is adapted to contact and be fitted to the side surfaces 12 of the recess 11, extending in the center axis direction.

The field rotor 100 comprises a plurality of wedge members 40, each of which extends in the center axis direction and is disposed at a corresponding pair of two coil boxes 20 which are adjacent in the circumferential direction of the rotary shaft such that the wedge member is sandwiched between the two coil boxes and is in contact with the two coil boxes 20.

A gap 70 is formed between each of the coil boxes 20 and the peripheral surface such that the gap 70 extends in the center axis direction and circumferential direction of the rotary shaft.

Hereinafter, the field rotor 100 of the superconducting rotary machine according to Example 1 will be described in more detail. The field rotor 100 of the present example is of a six-pole type. The field rotor of Embodiment 1 is preferably of a multipolar type. The field rotor is not limited to the six-pole field rotor, and may be, for example, a four-pole field rotor, an eight-pole field rotor, etc.

As shown in FIGS. 1 and 2, the rotary shaft 10 has a hollow and substantially hexagonal cylinder shape in which a cylindrical space extending in the center axis direction is formed. The rotary shaft 10 is made of, for example, SUS316 stainless steel which is a non-magnetic material and has an excellent low-temperature characteristic. The peripheral surface (side surface, side peripheral surface) of the rotary shaft 10 is provided with the recesses 12 with a predetermined depth, extending in the center axis direction. Each of the recesses 12 has a plurality of threaded holes to fasten the coil box 20 to the rotary shaft 10.

As shown in FIGS. 1 and 2, each of the coil boxes 20 includes a box member 21 and a lid member 22. The box member 21 and the lid member 22 are provided with a recess, to store the superconducting coil 30 therein. The superconducting coil 30 is stored in the recess such that it is sandwiched between two low-heat contraction members 35. In the present example, the number of coil boxes 20 is six and the number of superconducting coils 30 is six. The coil box 20 is made of, for example, SUS316 stainless steel. Each of the box member 21 and the lid member 22 has a plurality of holes into which screws are inserted, respectively, to fasten the coil box 20 to the rotary shaft 10. The superconducting coil 30 and the low-heat contraction members 35 are placed in the recess of the box member 21, and the lid member 22 covers them, thus allowing the superconducting coil 30 and the low-heat contraction members 35 to be stored in the coil box 20. After that, bolts and the like are inserted into the holes formed in the box member 21 and the lid member 22 and threadingly engaged with the threaded holes formed in the recess 12 of the rotary shaft 10, respectively. In this way, the coil box 20 is removably fastened to the rotary shaft 10.

As shown in FIG. 4, the coil box 20 has the walls 25 defining the inner space. The cooling medium passage 23 is provided inside a portion of the wall 25 which portion faces the rotary shaft 10 such that the cooling medium passage 23 penetrates the wall 25 linearly in the center axis direction. The thickness of the wall may be set to 15 mm or more and 30 mm or less.

As shown in FIGS. 2 and 4, the low-heat contraction members 35 are disposed between the superconducting coil 30 and the walls 25 which face the superconducting coil 30 in the radial direction of the rotary shaft 10, i.e., the upper and lower walls 25 of FIG. 4. In other words, each of the low-heat contraction members 35 is disposed between the superconducting coil 30 and corresponding one of the two walls 25 parallel to the peripheral surface of the rotary shaft 10. During supply of a current, due to a hoop stress, the superconducting coil 30 tends to expand in a direction (center axis direction of the rotary shaft 10, circumferential direction of the rotary shaft) which is perpendicular to the axial direction (winding axis direction) of the coil. For this reason, it is less likely that a gap is formed between the coil and the wall 25 in the direction perpendicular to the axial direction (winding axis direction) of the coil. In contrast, no hoop stress acts in the axial direction (radial direction of the rotary shaft 10) of the coil, and hence it is more likely that a gap is formed between the coil and the wall 25 in the axial direction (radial direction of the rotary shaft 10). If the gap is generated, a heat conductivity degrades, and the temperature distribution of the superconducting coil is more likely to become non-uniform. In light of this, the low-heat contraction members 35 may be disposed between the superconducting coil 30 and the walls 25 which face the superconducting coil 30 in the axial direction of the coil (radial direction of the rotary shaft 10). This makes it possible to improve the uniformity of the temperature distribution of the superconducting coil 30. The low-heat contraction members 35 can be made of, for example, carbon steel, nickel steel, etc. The shape and material of the low-heat contraction members 35 may be suitably set so that the superconducting coil 30 is retained inside the coil box 20 under a sufficient contact interface pressure, when the superconducting coil 30 is cooled during the operation.

As shown in FIGS. 1 and 2, a cooling medium pipe 50 is coupled to the cooling medium passage 23 by joints or the like, at front and rear end portions of the coil boxes 20. A cooling medium such as liquid nitrogen, liquid helium, or a low-temperature helium gas is supplied to the cooling medium passage 23 via the cooling medium pipe 50.

As shown in FIG. 5, the cooling medium pipe 50 includes a center supply pipe 51 extending in the center axis direction such that the center supply pipe 51 is a specified distance apart from the center axis inside the cylindrical space, a center discharge pipe 52 extending coaxially with the center axis inside the cylindrical space, first branch supply pipes 54 which branch from the center supply pipe 51 in locations of a first branch supply joint 53 attached to the rear end portion of the rotary shaft 10 such that the first branch supply pipes 54 extend in three directions (three directions are radial direction) at pitches of 120 degrees and are connected to inlets of the cooling medium passages 23 of the corresponding coil boxes 20, respectively, first branch discharge pipes 56 which branch from the center discharge pipe 52 in locations of a first branch discharge joint 55 attached to the rear end portion of the rotary shaft 10 such that the first branch discharge pipes 56 extend in three directions (three directions are radial direction) at pitches of 120 degrees and are connected to outlets of the cooling medium passages 23 of the corresponding coil boxes 20, respectively, second branch supply pipes 58 which branch from the center supply pipe 51 in locations of a second branch supply joint 57 attached to the front end portion of the rotary shaft 10 such that the second branch supply pipes 58 extend in three directions (three directions are radial direction) at pitches of 120 degrees and are connected to inlets of the cooling medium passages 23 of the corresponding coil boxes 20, respectively, and second branch discharge pipes 60 which branch from the center discharge pipe 52 in locations of a second branch discharge joint 59 attached to the front end portion of the rotary shaft 10 such that the second branch discharge pipes 60 extend in three directions (three directions are radial direction) at pitches of 120 degrees and are connected to outlets of the cooling medium passages 23 of the corresponding coil boxes 20, respectively.

When viewed from the center axis direction, the first branch supply pipes 54 and the second branch supply pipes 58 extend from the center axis such that the first branch supply pipes 54 are 60 degrees deviated from the second branch supply pipes 58, respectively, and as a result, six supply pipes extend radially at equal intervals of 60 degrees. Also, when viewed from the center axis direction, the first branch discharge pipes 56 and the second branch discharge pipes 60 extend from the center axis such that the first branch discharge pipes 56 are 60 degrees deviated from the second branch discharge pipes 60, respectively, and as a result, six discharge pipes extend radially at equal intervals of 60 degrees.

The cooling medium pipe 50 is made of, for example, SUS316 stainless steel.

As shown in FIG. 5, each of the cooling medium passages 23 is connected at its inlet to the first branch supply pipe 54 or the second branch supply pipe 58 in the wall 25 at one of the front and rear ends of the coil box 20, extends linearly in the center axis direction, turns back at the other (opposite) end, extends linearly in the center axis direction again, and is connected to the first branch discharge pipe 56 or the second branch discharge pipe 60 in the wall 25 at one of the front and rear ends of the coil box 20. In other words, the cooling medium passages 23 are configured such that the passage which has the inlet at the front end of the coil box 20, turns back at the rear end of the coil box 20 and has the outlet at the front end of the coil box 20, and the passage which has the inlet at the rear end of the coil box 20, turns back at the front end of the coil box 20 and has the outlet at the rear end of the coil box 20, are disposed alternately in adjacent coil boxes 20.

The cooling medium passage 23 can be formed, for example, in the following manner. The linear passage extending from the wall 25 at one of the front and rear ends of the coil box 20 which is elongated in the forward and rearward direction to the opposite end portion, is formed by using a drill or the like. Then, a turn-back passage is formed from laterally to be connected to the end portion of the drilled passage. Lastly, an unnecessary passage in the vicinity of the side surface is sealed by welding or the like.

In the above described configuration, the cooling medium flows in directions as indicated by arrows of FIG. 5. Specifically, the cooling medium supplied to the center supply pipe 51 from behind the rotary shaft 10 is supplied to the three first branch supply pipes 54 via the first branch supply joint 53 at the rear end, and to the three second branch supply pipes 58 via the second branch supply joint 57 at the front end. The cooling medium supplied to the first branch supply pipes 54 are supplied to the first branch discharge pipes 56 by way of the cooling medium passages 23, respectively. The cooling medium supplied to the second branch supply pipes 58 are supplied to the second branch discharge pipes 60 by way of the cooling medium passages 23, respectively. The cooling medium supplied to the first branch discharge pipes 56 are supplied to the center discharge pipe 52 via the first branch discharge joint 55 at the rear end. The cooling medium supplied to the second branch discharge pipes 60 are supplied to the center discharge pipe 52 via the second branch discharge joint 59 at the front end. The cooling medium supplied to the center discharge pipe 52 is discharged rearward of the rotary shaft 10.

In accordance with the above described configuration, the six coil boxes 20 and the superconducting coils 30 stored therein can be cooled effectively, by using the cooling medium flowing through the cooling medium pipe 50 and the cooling medium passages 23. The above described specific configurations of the cooling medium pipe 50 and of the cooling medium passages 23 are merely exemplary, and may be suitably modified depending on the kind of the cooling medium, the materials, sizes, or the like of the rotary shaft 10 and of the coil boxes 20, etc., of course.

As shown in FIG. 3, the gap 70 is formed between the recess 11 and the convex portion 24. More specifically, the gap 70 is formed between the bottom surface of the recess 11 and the upper surface of the convex portion 24. The gap 70 may be formed in such a manner that the bottom surface of the recess 11 and the upper surface of the convex portion 24 are formed as flat surfaces, respectively, and the depth (height of side surfaces 12) of the recess 11 is set larger than the height (height of side surfaces 26) of the convex portion 24. Preferably, the height (thickness) of the gap 70 is sufficient to store a protective resistor 75 therein and to suppress heat transfer from the rotary shaft 10 to the coil box 20. Specifically, for example, the height (thickness) of the gap 70 is preferably set to 3 mm or more and 10 mm or less. As defined herein, the height (thickness) refers to the height (thickness) in the radial direction of the rotary shaft 10.

The rotary shaft 10 is not easily cooled, because heat is transferred from an outside bearing or the like to the rotary shaft 10. The gap 70 allows for heat insulation between the rotary shaft 10 with a relatively high temperature and the coil box 20 with a relatively low temperature, which makes it possible to efficiently cool the superconducting coil 30 stored in the coil box 20.

As shown in FIG. 2, the superconducting coil 30 is of a race truck type. In a linear portion of the coil of the race truck type, the hoop stress generated during the current supply increases especially, and there is a higher probability that the coil will be mechanically broken down. In the present example, the wall 25 of the coil box 20 applies to the superconducting coil 30 a normal force against the hoop stress. Therefore, such a probability of breakdown can be significantly reduced. The superconducting coil 30 is formed of, for example, a bismuth based superconductive wire material, or a yttrium based superconductive wire material. The superconducting coil 30 is cooled to, for example, about 30K by use of the cooling medium flowing through the cooling medium passage 23 and thereby is placed in a superconductive state.

All of the six superconducting coils 30 constituting six field poles may be connected in series by wires inserted into the holes (not shown) formed in the walls 25 of the coil boxes 20. The both ends of current paths constituted by the superconducting coils 30 are guided to outside the rotary machine via wires (not shown) inside the rotary shaft 10 and brushes (not shown) and are connected to an electric power supply (not shown). When a current is supplied to the wires, the six superconducting coils 30 are excited to N-pole and S-pole alternately in the circumferential direction.

As shown in FIG. 2, the six peripheral surfaces of the rotary shaft 10 are provided with the recesses 11 into which the convex portions 24 of the corresponding coil boxes 20 are fitted, respectively. Each of the recesses 11 has two side surfaces 12 extending along the center axis and in parallel with the radial direction, and one bottom surface extending along the center axis and in parallel with the circumferential direction. Each of the coil boxes 20 is provided with the convex portion 24 to be fitted into the corresponding recess 11 of the rotary shaft 10. The convex portion 24 has two side surfaces 26 extending along the center axis and in parallel with the radial direction, and one top surface extending along the center axis and in parallel with the circumferential direction. The bottom surface of the recess 11 is substantially equal in width to the top surface of the convex portion 24. In a state in which the side surfaces 26 are in surface contact with the side surfaces 12, the convex portion 24 is fitted into the recess 11.

The side surfaces 12 and the side surfaces 26 are not necessarily parallel to the radial direction. The side surfaces 12 and the side surfaces 26 are preferably formed to allow torque to be transmitted from the coil box 20 to the rotary shaft 10 with the side surfaces 12 being in contact with the side surfaces 26, respectively. Therefore, the side surfaces 12 and the side surfaces 26 may be parallel to a plane having a predetermined angle which is larger than 0 degree and smaller than 90 degrees with respect to the radial direction. The side surfaces 12 and the side surfaces 26 need not be flat surfaces, but may be curved surfaces. The side surfaces 12 may be entirely or partially in contact with the side surfaces 26, respectively. The cross-section of the wedge member 40 which is taken along a plane which is perpendicular to the center axis has a taper shape with a width reduced toward the center axis.

As shown in FIGS. 1 and 2, the wedge member 40 is retained between the two coil boxes 20 which are adjacent in the circumferential direction of the rotary shaft 10. In other words, one wedge member 40 corresponds to one boundary between adjacent peripheral surfaces. The coil box 20 has two side surfaces extending along the center axis and being parallel to the radial direction. The wedge member 40 also has two side surfaces extending along the center axis and being parallel to the radial direction.

The wedge member 40 has a plurality of holes into which screws are inserted, respectively, to fasten the wedge member 40 to the rotary shaft 10. The coil box 20 and the wedge member 40 are fastened to the rotary shaft 10 by using screws such as bolts. In a state in which the coil box 20 and the wedge member 40 are fastened to the rotary shaft 10, the side surface of the coil box 20 is in surface contact with the side surface of the wedge member 40. The side surface of the coil box 20 and the side surface of the wedge member 40 may be entirely or partially in contact with other.

Example 2

Figure 6:
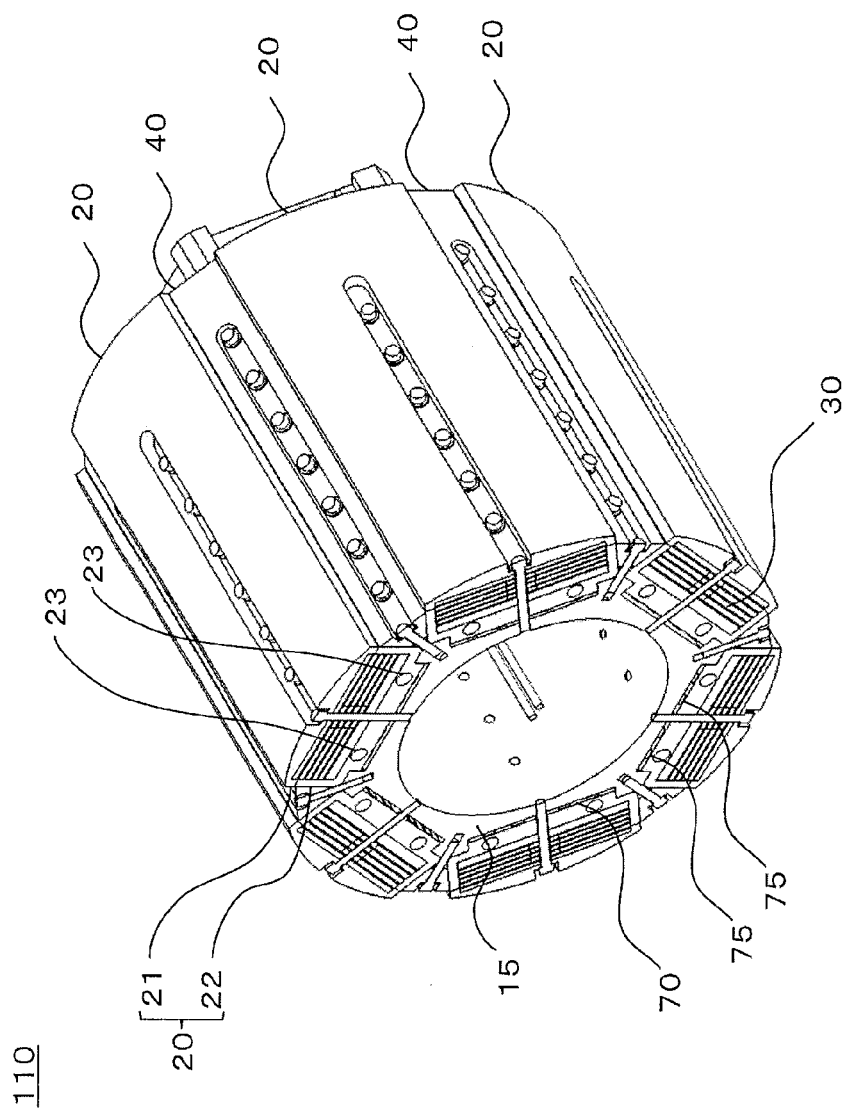
FIG. 6 is a perspective view showing the cross-section of the schematic configuration of a field rotor of a superconducting rotary machine according to Example 2 of Embodiment 1.
Figure 7:
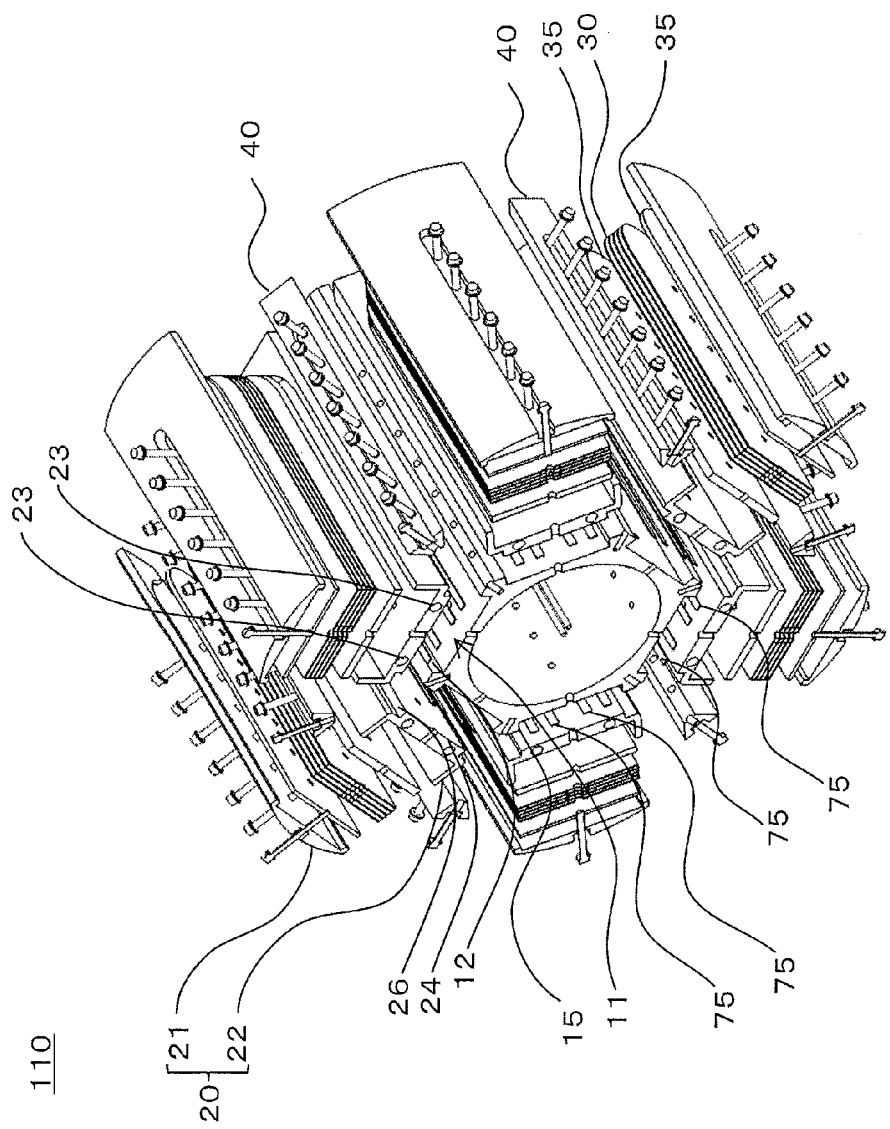
FIG. 7 is an exploded view showing the cross-section of the schematic configuration of the field rotor of the superconducting rotary machine according to Example 2 of Embodiment 1.

FIG. 6 is a perspective view showing the cross-section of the schematic configuration of a field rotor of a superconducting rotary machine according to Example 2 of Embodiment 1. FIG. 7 is an exploded view showing the cross-section of the schematic configuration of the field rotor of the superconducting rotary machine according to Example 2 of Embodiment 1. The external appearance of the entire field rotor of the present example in an assembled state is similar to that of Example 1 shown in FIG. 1, and therefore will not be shown in the drawings.

A field rotor 110 of the superconducting rotary machine of Example 1 further includes protective resistors 75 in addition to the constituents of the field rotor 100 of Example 1. Each of the protective resistors 75 is fastened to the corresponding coil box 20 such that the protective resistor 75 is disposed within the corresponding gap 70 and connected in parallel with the superconducting coil 30 corresponding to the gap 70.

Hereinafter, the field rotor 110 of the superconducting rotary machine according to Example 2 will be described in more detail. The constituents other than the above mentioned constituents are similar to those of the field rotor 100 of the superconducting rotary machine according to Example 1, and therefore will not be described in detail repeatedly.

The protective resistor 75 is made of, for example, stainless steel or titanium. The resistance value of the protective resistor 75 may be, for example, 5Ω. The entire protective resistor 75 is preferably disposed within the gap 70.

The protective resistors 75 are connected in parallel with the superconducting coils 30, respectively, in a circuit including the superconducting coils 30 and an electric power supply (not shown) provided outside the rotary machine. The protective resistors 75 are preferably provided such that each of them corresponds to one superconducting coil 30 forming each field pole. In other words, when the superconducting coil 30 forming one field pole is assumed as one coil, the protective resistor 75 is preferably provided for each coil. In the present example, one coil box 20, one superconducting coil 30 and one protective resistor 75 are provided so as to correspond to one field pole. The relationship among the number of field poles, the number of coil boxes 20, the number of superconducting coils 30 and the number of protective resistors 75 is not particularly limited, and they may be equal to each other, they may be different from each other, or otherwise they may be partially equal to each other and partially different from each other.

The circuit including the superconducting coils 30 and the protective resistors 75 may be disconnected from the electric power supply, for example, by using a protective switch or the like provided in the vicinity of the electric power supply. The protective switch may be, for example, a switch placed on a wire provided between the electric power supply, and a point at which the wires connected to the superconducting coils 30 and the wires connected to the protective resistors 75 branch. Or, the protective switch may be, for example, a switch placed on a wire between the electric power supply, and a point at which the wires connected to the superconducting coils 30 and the wires connected to the protective resistors 75 are joined together.

In a superconductive state, the switch is closed. When a quench detector (not shown) detects a quench (normal conduction transition) of the superconducting coil 30, the switch is controlled to be opened. When the switch is opened, the circuit is formed by the superconducting coils 30 and the protective resistors 75. In this state, the protective resistors 75 quickly convert energy of a current flowing through the superconducting coils 30 into heat energy, etc., which reduces a possibility of a combustion damage to the superconducting coils 30.

The specific configurations of the quench detector, the protective switch, the protective resistor, etc., may be well-known configurations, and will not be described specifically.

Embodiment 2

A field rotor of a superconducting rotary machine according to a first aspect of Embodiment 2 comprises a rotary shaft, a plurality of superconducting coils, low-heat contraction members, and coil retaining members, wherein each of the coil retaining members is configured to retain the corresponding superconducting coil on a peripheral surface of the rotary shaft in a state in which the superconducting coil is disposed between the coil retaining member and the peripheral surface of the rotary shaft and the coil retaining member is fastened to the peripheral surface of the rotary shaft, each of the low-heat contraction members is provided in a location which is at least one of between the superconducting coil and the coil retaining member, and between the superconducting coil and the peripheral surface of the rotary shaft, the low-heat contraction members have a lower mean coefficient of linear thermal expansion than the coil retaining members, and the superconducting coils constitute field windings of the superconducting rotary machine.

In this configuration, even when the superconducting coil is contracted (shrunk) due to cooling, the low-heat contraction member is filled with a desired pressure in the gap between the superconducting coil and the coil retaining member, and thus heat conduction can smoothly take place. As a result, the superconducting coil can be cooled more efficiently and more uniformly.

The rotary shaft is an output shaft when the superconducting rotary machine is an electric motor, and an input shaft when the superconducting rotary machine is an electric generator.

The coil retaining member may be, for example, a plate-like member for retaining the superconducting coil between the rotary shaft and the coil retaining member. Or, the coil retaining member may be the coil box described in Embodiment 1.

The "peripheral surface" may be a curved surface or a flat surface.

The phrase "the superconducting coil is disposed between the coil retaining member and the peripheral surface of the rotary shaft" is meant to include a case where the superconducting coil is disposed between at least a portion of the coil retaining member and the peripheral surface of the rotary shaft. Specifically, for example, in a case where the coil retaining member is the coil box storing the superconducting coil therein, the superconducting coil is disposed between the peripheral surface of the rotary shaft, and the wall (portion of the coil retaining member) of the coil box, which wall is on an opposite side (radially outward side) of the peripheral surface of the rotary shaft. In this case, also, it may be interpreted that the superconducting coil is disposed between the coil retaining member and the peripheral surface of the rotary shaft.

The mean coefficient of linear thermal expansion refers to a mean coefficient of linear thermal expansion in a temperature range from a room temperature. The room temperature may be a temperature before the coil is cooled. Specifically, the mean coefficient of linear thermal expansion in a temperature range from the room temperature may be a mean coefficient of linear thermal expansion in a temperature range from the temperature at a time point before the coil is cooled to a temperature at a time point when the coil has been cooled. More specifically, for example, the value of the mean coefficient of linear thermal expansion is a rate of expansion of the length of an object due to a temperature increase, which is expressed per 1 degrees C. (=1K) with the room temperature being a reference temperature, and its unit may be 1/K. The mean coefficient of linear thermal expansion of the low-heat contraction member and the mean coefficient of linear thermal expansion of the superconducting coil are preferably set so that the linear thermal expansion amount of the whole member including the low-heat contraction member and the superconducting coil is preferably substantially equal to or less than that of the coil retaining member.

According to a second aspect of Embodiment 2, in the field rotor of the superconducting rotary machine according to the first aspect, the mean coefficient of linear thermal expansion of the low-heat contraction member is lower than the mean coefficient of linear thermal expansion of the superconducting coil.

In this configuration, increasing of the contact interface pressure of the heat transfer surface can be further facilitated.

According to a third aspect of Embodiment 2, in the field rotor of the superconducting rotary machine according to the first aspect or the second aspect, the coil retaining members are coil boxes, and the coil boxes extend in a center axis direction of the rotary shaft, have walls defining spaces within the coil boxes, respectively, and are removably fastened to a peripheral surface of the rotary shaft, and the superconducting coils are placed in the spaces of the coil boxes, respectively.

In this configuration, the coil boxes storing the superconducting coils, respectively, can be assembled, and then the coil boxes can be mounted to the rotary shaft. This makes it possible to manufacture the field rotor more easily and more accurately than a configuration in which the superconducting coils are directly mounted to the rotary shaft.

The coil boxes may be similar to those of Embodiment 1, and will not be described in detail repeatedly.

According to a fourth aspect of Embodiment 1, in the field rotor of the superconducting rotary machine according to the third aspect, each of the coil boxes includes a cooling medium passage through which a cooling medium used for cooling the superconducting coil flows.

In this configuration, since the coil box includes the cooling medium passage, the superconducting coil can be cooled more effectively than a configuration in which the cooling medium passage is provided in, for example, the rotary shaft.

The cooling medium may be similar to the cooling medium of Embodiment 1, and will not be described in detail repeatedly.

According to a fifth aspect of Embodiment 2, the field rotor of the superconducting rotary machine according to the fourth aspect, comprises gaps formed between the respective coil boxes and the peripheral surface such that each of the gaps extends in the center axis direction and a circumferential direction of the rotary shaft.

In this configuration, since the coil box and the rotary shaft are thermally insulated from each other via the gap, the superconducting coil can be cooled more effectively.

The "circumferential direction" is a direction perpendicular to the axial direction and the radial direction. The peripheral surface may be, for example, a curved surface or a flat surface.

According to a sixth aspect of Embodiment 2, the field rotor of the superconducting rotary machine according to the fifth aspect, further comprises protective resistors which are fastened to the coil boxes, respectively such that the protective resistors are disposed within gaps, respectively, and are connected in parallel with the superconducting coils corresponding to the gaps, respectively.

In this configuration, if breakdown of a superconductivity occurs, the superconducting coils can be protected by the protective resistors. In addition, since the protective resistors can be efficiently disposed within the gaps, respectively, the field rotor can be reduced in size.

The protective resistors may be similar to the protective resistors of Embodiment 1, and will not be described in detail repeatedly.

According to a seventh aspect of Embodiment 2, in the field rotor of the superconducting rotary machine according to any one of the first to sixth aspects, the peripheral surface is provided with a plurality of recesses corresponding to the coil boxes, respectively, the recesses are formed to face corresponding coil boxes, respectively, each of the recesses has side surfaces extending in the center axis direction, each of the coil boxes is provided with a convex portion extending in the center axis direction and protruding toward the rotary shaft, and the convex portion is fitted into corresponding one of the recesses in a state in which the convex portion is in contact with the side surfaces of the recess extending in the center axis direction.

In this configuration, torque generated in the superconducting coil can be efficiently transmitted to the rotary shaft via contact surfaces of the coil box and of the rotary shaft. In addition, contact portions of the coil box and of the rotary shaft can be reduced to a smallest possible extent to reduce a heat conductivity between the coil box and the rotary shaft. Thus, the superconducting coil and the coil box can be cooled more efficiently.

According to an eighth aspect of Embodiment 2, the field rotor of the superconducting rotary machine according to any one of the first to seventh aspects, further comprises a plurality of wedge members, and each of the wedge members extends in the center axis direction and is disposed at a corresponding pair of two coil boxes which are adjacent in the circumferential direction of the rotary shaft such that the wedge member is sandwiched between the two coil boxes and is in contact with the two coil boxes.

In this configuration, a component of the hoop stress generated in the superconducting coils, which component does not contribute to the torque, can be cancelled via one wedge member corresponding to the two adjacent coil boxes.

According to a ninth aspect of Embodiment 2, in the field rotor of the superconducting rotary machine according to any one of the second to fourth aspects, the cooling medium passage is formed inside a portion of the wall which faces the rotary shaft.

In this configuration, since the cooling medium passage can be integrated with the coil box, the field rotor can be manufactured more easily and more accurately.

In Embodiment 2, the coil box, the cooling medium passage, the gap, the protective resistor, the recess, the convex portion, and the wedge member are not essential constituents, and may be suitably omitted.

The superconducting rotary machine of the present embodiment may include, for example, a superconducting motor and a superconducting generator. Although the following example is described assuming that a voltage and a current are supplied continuously from outside the rotary machine to the field windings of the field rotor, the field windings may be used in a permanent current mode in which a voltage and a current are not supplied continuously from outside the rotary machine to the field windings.

Example 3

Figure 8:
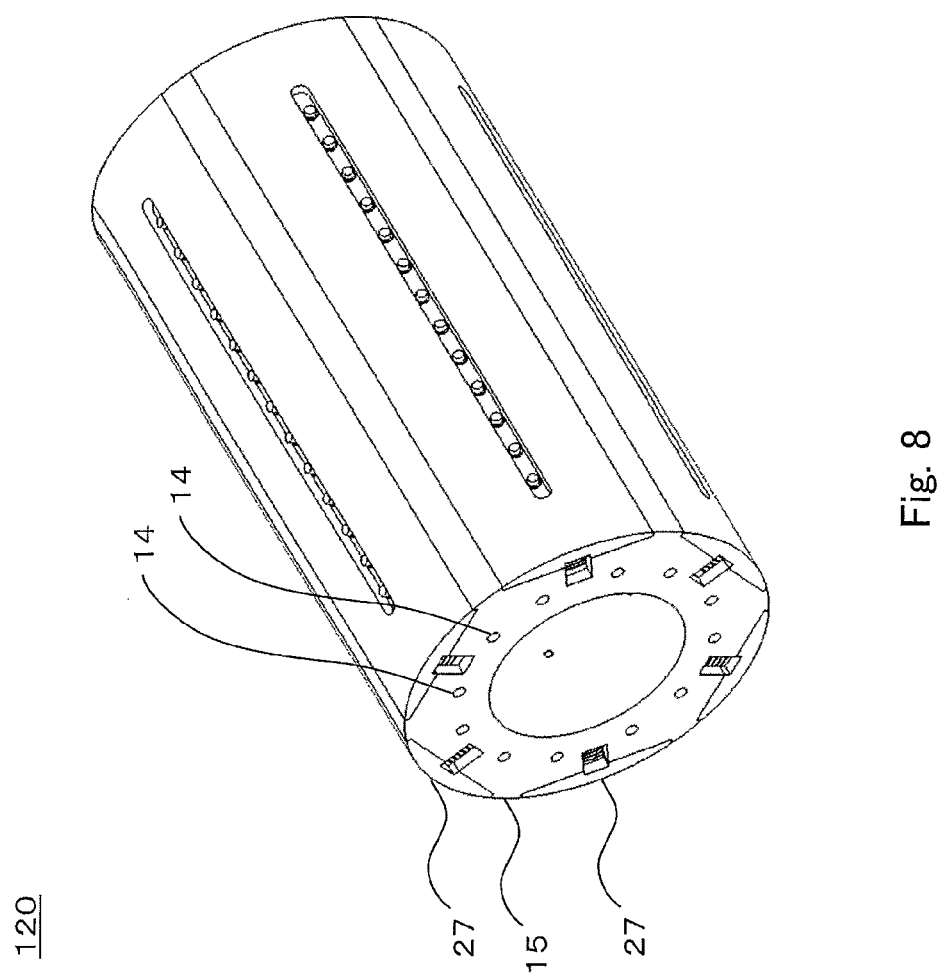
FIG. 8 is a perspective view showing the schematic configuration of a field rotor of a superconducting rotary machine according to Example 3 of Embodiment 2.
Figure 9:
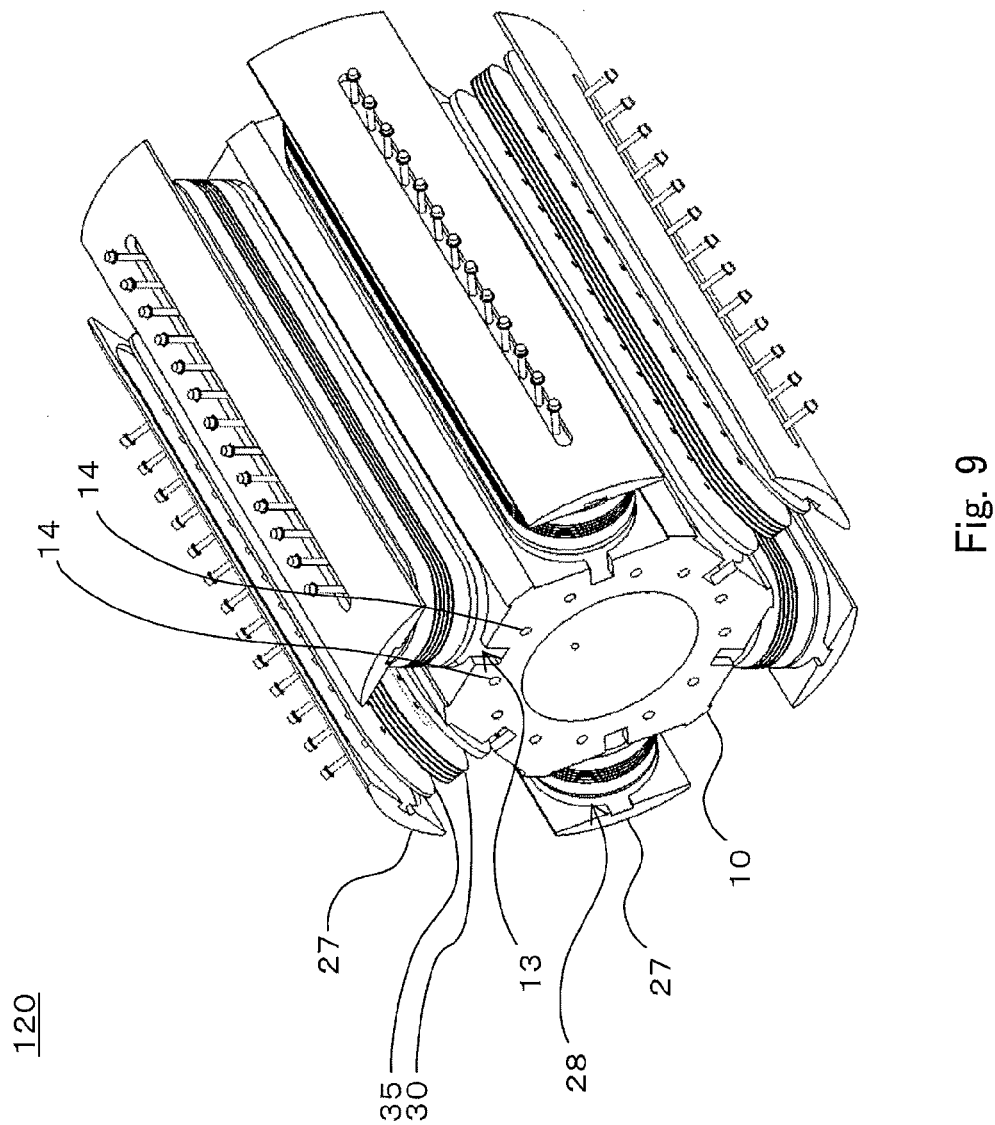
FIG. 9 is an exploded view showing the schematic configuration of the field rotor of the superconducting rotary machine according to Example 3 of Embodiment 2.
Figure 10:
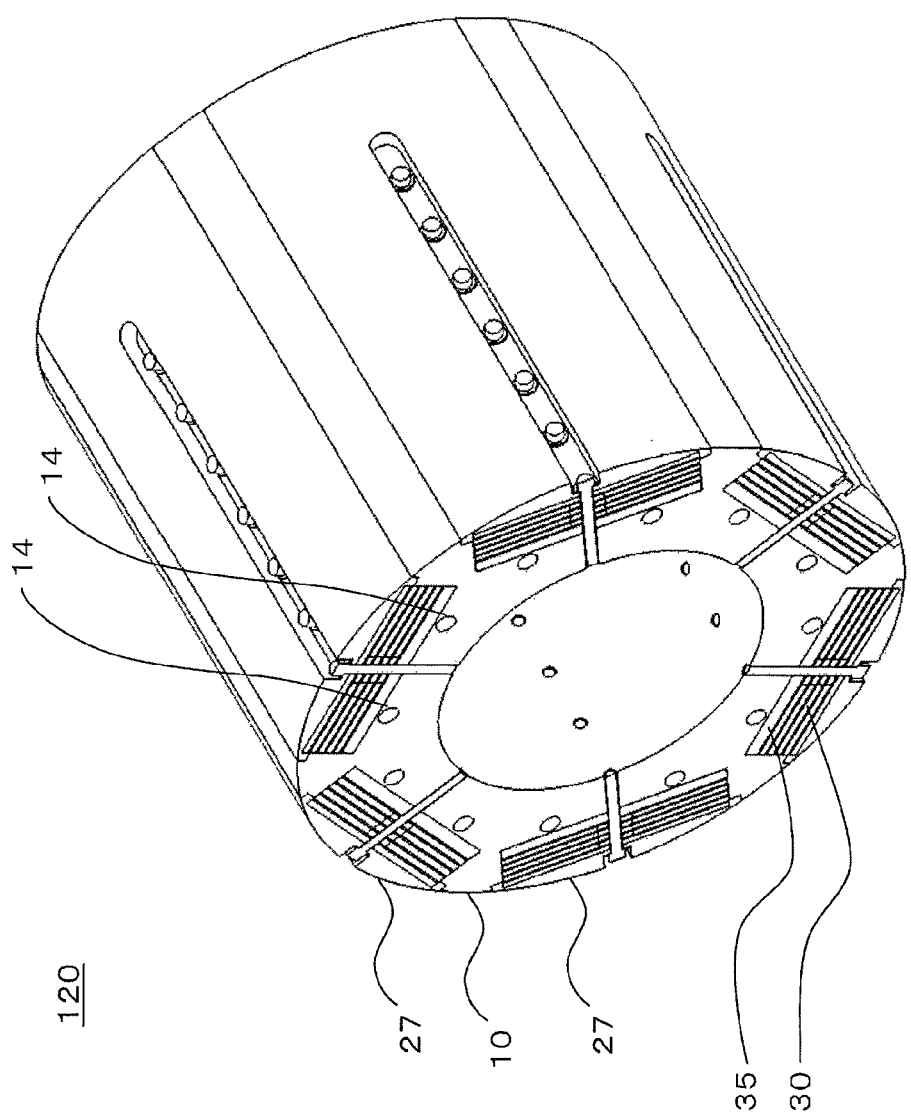
FIG. 10 is a perspective view showing the cross-section of the schematic configuration of the field rotor of the superconducting rotary machine according to Example 3 of Embodiment 2.

FIG. 8 is a perspective view showing the schematic configuration of a field rotor of a superconducting rotary machine according to Example 3 of Embodiment 2. FIG. 9 is an exploded view showing the schematic configuration of the field rotor of the superconducting rotary machine according to Example 3 of Embodiment 2. FIG. 10 is a perspective view showing the cross-section of the schematic configuration of the field rotor of the superconducting rotary machine according to Example 3 of Embodiment 2.

A field rotor 120 of the superconducting rotary machine according to Example 3 includes a rotary shaft 15, a plurality of superconducting coils 30, low-heat contraction members 35, and coil retaining members 27, wherein each of the coil retaining members 27 is configured to retain the corresponding superconducting coil 30 on the peripheral surface of the rotary shaft 15 in a state in which the superconducting coil 30 is disposed between the coil retaining member 27 and the peripheral surface of the rotary shaft 15 and the coil retaining member 27 is fastened to the peripheral surface of the rotary shaft 15, each of the low-heat contraction members 35 is provided in a location which is at least one of between the superconducting coil 30 and the coil retaining member 27, and between the superconducting coil 30 and the peripheral surface of the rotary shaft 15, the low-heat contraction members 35 have a lower mean coefficient of linear thermal expansion than the coil retaining members 27. The mean coefficient of linear thermal expansion of the low-heat contraction member 35 may be lower than that of the coil retaining member 27 and that of the superconducting coil 30. The superconducting coils 30 constitute the field windings of the superconducting rotary machine.

Hereinafter, the field rotor 120 of the superconducting rotary machine according to Example 3 will be described in more detail. The field rotor 120 of the present example is of a six-pole type. The field rotor of Embodiment 2 is preferably of a multipolar type. The field rotor is not limited to the six-pole field rotor, and may be, for example, a four-pole field rotor, an eight-pole field rotor, etc.

As shown in FIGS. 8, 9, and 10, the rotary shaft 15 has a hollow and substantially hexagonal cylinder shape in which a cylindrical space extending in the center axis direction is formed. The rotary shaft 15 is made of for example, SUS316 stainless steel which is a non-magnetic material and has an excellent low-temperature characteristic. The peripheral surface (side surface, side peripheral surface) of the rotary shaft 15 is provided with recesses 13 with a predetermined depth, extending in the center axis direction. The recesses 13 have substantially the same shape as that of the superconducting coils 30, when viewed from above. Each of the recesses 13 has a plurality of threaded holes to fasten the coil retaining member 27 to the rotary shaft 15. A portion of the superconducting coil 30 is stored in the recess 13 such that the superconducting coil 30 is sandwiched between two low-heat contraction members 35.

As shown in FIGS. 8, 9, and 10, each of the coil retaining members 27 of the present example is constituted by a plate-like member extending in the center axis direction and the circumferential direction to sandwich the superconducting coil between the coil retaining member 27 and the rotary shaft. The coil retaining member 27 is provided with a recess 28 in which the superconducting coil 30 is stored. A portion of the superconducting coil 30 is stored in the recess 28 such that the superconducting coil 30 is sandwiched between two low-heat contraction members 35. In the present example, the number of coil retaining members 27 is six and the number of superconducting coils 30 is six. The coil retaining members 27 are made of, for example, SUS316 stainless steel. Each of the coil retaining members 27 has a plurality of holes into which screws are inserted, respectively, to fasten the coil retaining member 27 to the rotary shaft 15. The superconducting coil 30 and the low-heat contraction members 35 are placed in each of the recesses 13, and the coil retaining member 27 covers them, thus allowing the superconducting coil 30 and the low-heat contraction members 35 to be stored in the space formed between the rotary shaft 15 and the coil retaining member 27. After that, bolts and the like are inserted into the holes formed in the coil retaining members 27 and threadingly engaged with the threaded holes formed in the recess 13 of the rotary shaft 15, respectively. In this way, the coil retaining members 27 are removably fastened to the rotary shaft 15. Alternatively, the coil retaining members 27 may be unremovably fastened to the rotary shaft 15 by welding or the like such that the coil retaining members 27.

As shown in FIGS. 8, 9, and 10, the outer peripheral portion of the rotary shaft 15 is provided with a pair of cooling medium passages 14 corresponding to each of the superconducting coils 30. For example, the cooling medium passages 14 penetrate the rotary shaft 15 in the center axis direction. The cooling medium may be flowed in a well-known manner, which will not be descried in detail.

As shown in FIGS. 9 and 10, the low-heat contraction members 35 are disposed between the bottom surface of the recess 13 and the superconducting coil 30, and between the reverse surface (surface close to the rotary shaft 15) of the coil retaining member 27 and the superconducting coil 30. During supply of a current, due to a hoop stress, the superconducting coil 30 tends to expand radially. For this reason, it is less likely that a gap is formed between the superconducting coil 30 and the wall of the recess 13, and between the superconducting coil 30 and the wall of the recess 28, in the radial direction of the coil. In contrast, no hoop stress acts in the axial direction of the coil, and hence it is more likely that a gap is formed between the superconducting coil 30 and the bottom surface of the recess 13, and between the superconducting coil 30 and the reverse surface of the coil retaining member 27. Therefore, the low-heat contraction members 35 are preferably disposed between the superconducting coil 30 and the bottom surface of the recess 13, and between the superconducting coil 30 and the reverse surface of the coil retaining member 27. The low-heat contraction members 35 can be made of, for example, carbon steel, nickel steel, etc. The shape and material of the low-heat contraction members 35 may be suitably set so that the superconducting coil 30 is retained inside the coil box 20 under a sufficient contact interface pressure, when the superconducting coil 30 is cooled during the operation.

The superconducting coil 30 is, for example, cooled to about 30K by use of the cooling medium flowing through the cooling medium passages 14 and thereby is placed in a superconductive state. The both ends of current paths constituted by the superconducting coils 30 are guided to outside the rotary machine via wires (not shown) inside the rotary shaft 15 and brushes (not shown) and are connected to an electric power supply (not shown). When a current is supplied to the wires, the six-pole superconducting coils 30 are excited to N-pole and S-pole alternately in the circumferential direction. The superconducting coil 30 may be configured in a manner similar to that of Example 1 of Embodiment 1, except for the above, and will not be described in detail repeatedly.

Example 1 and Example 2 of Embodiment 1 may be applied to the present embodiment.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A field rotor of a superconducting rotary machine of the present invention is effectively used as a field rotor of a superconducting rotary machine which can provide a structure which allows the field rotor to be manufactured more easily and more accurately than a conventional example.

REFERENCE SIGNS LIST

10 rotary shaft
11 recess
12 side surface
13 recess
14 cooling medium passage
15 rotary shaft
20 coil box
21 box member
22 lid member
23 cooling medium passage
24 convex portion
25 wall
26 side surface
27 coil retaining member
28 recess
30 superconducting coil
35 low-heat contraction member
40 wedge member
50 cooling medium pipe
51 center supply pipe
52 center discharge pipe
53 first branch supply joint
54 first branch supply pipe
55 first branch discharge joint
56 first branch discharge pipe
57 second branch supply joint
58 second branch supply pipe
59 second branch discharge joint
60 second branch discharge pipe
70 gap
75 protective resistor
100, 110, 120 field rotor

The invention claimed is:
1. A field rotor of a superconducting rotary machine, comprising:
 a rotary shaft;
 a plurality of coil boxes; and
 a plurality of superconducting coils;
 wherein the coil boxes extend in a center axis direction of the rotary shaft, have walls defining spaces within the coil boxes, respectively, and are removably fastened to a peripheral surface of the rotary shaft,
 wherein the superconducting coils are disposed in the spaces of the coil boxes, respectively, and constitute field windings of the superconducting rotary machine, wherein a wall of each of the coil boxes is made of a heat-conductive metal, and wherein each of the coil boxes includes therein a cooling medium passage through which a cooling medium used for cooling the superconducting coil via the wall flows.

2. The field rotor of the superconducting rotary machine according to claim 1, wherein the cooling medium passage is provided to extend within the wall of each of the coil boxes.

3. The field rotor of the superconducting rotary machine according to claim 2, comprising:

gaps formed between the respective coil boxes and the peripheral surface such that each of the gaps extends in the center axis direction and a circumferential direction of the rotary shaft.

4. The field rotor of the superconducting rotary machine according to claim 3, comprising:

protective resistors fastened to the coil boxes such that the protective resistors are disposed within the gaps, respectively, and connected in parallel with the superconducting coils corresponding to the gaps, respectively.

5. The field rotor of the superconducting rotary machine according to claim 1, comprising:

low-heat contraction members, each of which is disposed between an inner surface of corresponding one of the coil boxes and corresponding one of the superconducting coils stored in the coil boxes, respectively;

wherein the low-heat contraction members have a lower mean coefficient of linear thermal expansion than the coil boxes, and wherein the low-heat contraction members are made of a heat-conductive metal.

6. The field rotor of the superconducting rotary machine according to claim 5, wherein the low-heat contraction members have a lower mean coefficient of linear thermal expansion than superconducting coils.

7. The field rotor of the superconducting rotary machine according to claim 1, wherein the peripheral surface is provided with a plurality of recesses corresponding to the coil boxes, respectively;

wherein the recesses are formed to face corresponding coil boxes, respectively;

wherein each of the recesses has side surfaces extending in the center axis direction; and wherein each of the coil boxes is provided with a convex portion extending in the center axis direction and protruding toward the rotary shaft, and the convex portion is fitted in corresponding one of the recesses in a state in which the convex portion is in contact with the side surfaces of the recess extending in the center axis direction.

8. The field rotor of the superconducting rotary machine according to claim 1, further comprising a plurality of wedge members;

wherein each of the wedge members extends in the center axis direction and is disposed at a corresponding pair of two coil boxes which are adjacent in the circumferential direction of the rotary shaft such that the wedge member is sandwiched between the two coil boxes and is in contact with the two coil boxes.

9. The field rotor of the superconducting rotary machine according to claim 2, wherein the cooling medium passage is formed inside a portion of the wall of the coil box, the wall facing the rotary shaft.

* * * * *